United States Patent
Im et al.

(10) Patent No.: US 9,417,372 B2
(45) Date of Patent: Aug. 16, 2016

(54) LENS SHEET INCLUDING LENS WITH VARIABLE CURVATURE AND DISPLAY DEVICE INCLUDING THE SAME

(71) Applicant: Samsung Display Co., Ltd., Yongin, Gyeonggi-Do (KR)

(72) Inventors: Hyun Deok Im, Seoul (KR); Hyun Jin Cho, Seoul (KR); Oleg Prudnikov, Suwon-si (KR); Dae Ho Yoon, Pohang-si (KR); Byoung Ho Cheong, Yongin-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 127 days.

(21) Appl. No.: 13/962,598

(22) Filed: Aug. 8, 2013

(65) Prior Publication Data

US 2014/0043851 A1    Feb. 13, 2014

(30) Foreign Application Priority Data

Aug. 9, 2012 (KR) .......................... 10-2012-0087389

(51) Int. Cl.
*F21V 8/00* (2006.01)
*G02F 1/1335* (2006.01)

(52) U.S. Cl.
CPC ............. *G02B 6/0011* (2013.01); *G02B 6/0053* (2013.01); *G02B 6/0045* (2013.01); *G02B 6/0046* (2013.01); *G02B 6/0068* (2013.01); *G02F 1/133615* (2013.01)

(58) Field of Classification Search
CPC .. G02B 6/0046; G02B 6/0058; G02B 6/0061; G02B 6/0011; G02B 6/0053; G02B 6/0068

USPC ........ 362/97.3, 311.09, 311.1, 606, 617–620, 362/628
See application file for complete search history.

(56) References Cited

U.S. PATENT DOCUMENTS

| | | | | |
|---|---|---|---|---|
| 2,216,965 A | * | 10/1940 | Sukumlyn | ...................... 359/724 |
| 4,992,704 A | * | 2/1991 | Stinson | .......................... 315/312 |
| 5,005,108 A | * | 4/1991 | Pristash et al. | ................. 362/602 |

(Continued)

FOREIGN PATENT DOCUMENTS

| | | |
|---|---|---|
| JP | 2010176029 A | 8/2010 |
| JP | 4666387 B2 | 1/2011 |

(Continued)

OTHER PUBLICATIONS

Travis, A., et al, "Collimated light from a waveguide for a display backlight", Optics Express, 2009, pp. 19714-19719. vol. 17, No. 22.

*Primary Examiner* — Jong-Suk (James) Lee
*Assistant Examiner* — Colin Cattanach
(74) *Attorney, Agent, or Firm* — Cantor Colburn LLP

(57) ABSTRACT

A lighting unit for a display device includes: a plurality of light sources which emits light; a wedge-shaped light guide having an incident surface disposed close to the light sources and an opposing surface disposed opposite the incident surface; and a lens sheet disposed on the light guide, where the lens sheet includes a plurality of lenses, each having an axis in a direction from the incident surface to the opposing surface, where the light guide is thinner at the incident surface than at the opposing surface, and a radius of curvature of each of the lenses is larger at the incident surface than the opposing surface.

17 Claims, 22 Drawing Sheets

(56) References Cited

U.S. PATENT DOCUMENTS

| | | | |
|---|---|---|---|
| 5,854,872 A * | 12/1998 | Tai | 385/133 |
| 6,781,760 B2 | 8/2004 | Hara | |
| 6,791,639 B2 * | 9/2004 | Colgan et al. | 349/95 |
| 7,387,421 B2 | 6/2008 | Lee et al. | |
| 7,448,775 B2 * | 11/2008 | Parker et al. | 362/331 |
| 7,635,200 B2 * | 12/2009 | Atsushi | 362/244 |
| 7,660,047 B1 | 2/2010 | Travis et al. | |
| 7,804,564 B2 | 9/2010 | Min et al. | |
| 7,901,125 B2 * | 3/2011 | Iwasaki | G02B 6/0041 362/615 |
| 7,969,531 B1 * | 6/2011 | Li et al. | 349/65 |
| 7,990,490 B2 * | 8/2011 | Lee et al. | 349/62 |
| 8,240,875 B2 * | 8/2012 | Roberts | F21S 4/008 362/217.05 |
| 2004/0264212 A1 | 12/2004 | Chung et al. | |
| 2006/0001974 A1 * | 1/2006 | Uehara et al. | 359/619 |
| 2006/0061869 A1 * | 3/2006 | Fadel et al. | 359/619 |
| 2006/0221636 A1 * | 10/2006 | Ohashi et al. | 362/612 |
| 2007/0242475 A1 * | 10/2007 | Minobe et al. | 362/608 |
| 2008/0225205 A1 | 9/2008 | Travis | |
| 2009/0244441 A1 | 10/2009 | Nagato et al. | |
| 2010/0085509 A1 * | 4/2010 | Seo | G02B 6/0036 349/65 |
| 2011/0216266 A1 * | 9/2011 | Travis | 349/62 |
| 2011/0255159 A1 | 10/2011 | Michael Krijn et al. | |
| 2012/0002132 A1 | 1/2012 | Yamazaki et al. | |
| 2012/0200802 A1 * | 8/2012 | Large | G02B 6/0046 349/62 |
| 2012/0268965 A1 * | 10/2012 | Ohno et al. | 362/606 |

FOREIGN PATENT DOCUMENTS

| | | |
|---|---|---|
| KR | 1020010026866 A | 4/2001 |
| KR | 1020030020538 A | 3/2003 |
| KR | 100712100 | 4/2007 |
| KR | 1020070080045 A | 8/2007 |
| KR | 100826946 | 4/2008 |
| KR | 100863773 | 10/2008 |
| KR | 100879948 | 1/2009 |
| KR | 1020090035373 A | 4/2009 |
| KR | 1020090083056 A | 8/2009 |
| KR | 1020090096299 A | 9/2009 |
| KR | 1020110001301 A | 1/2011 |

* cited by examiner

LENS SHEET INCLUDING LENS WITH VARIABLE CURVATURE AND DISPLAY DEVICE INCLUDING THE SAME

This application claims priority to Korean Patent Application No. 10-2012-0087389, filed on Aug. 9, 2012, and all the benefits accruing therefrom under 35 U.S.C. §119, the content of which in its entirety is herein incorporated by reference.

BACKGROUND (a) Field

Exemplary embodiments of the invention relate to a lighting unit for a display device and a display device including the lighting unit.

(b) Description of the Related Art

Non-emissive display devices such as liquid crystal displays ("LCDs") may include a lighting unit that provides light thereto or may use natural light to display images of desired luminance since the non-emissive display devices may not emit light by themselves.

A lighting unit for a display device may include a light source and various structures that guide light emitted from the light source toward a display panel and change characteristics of the light. In particular, the lighting unit may include a light guide that changes a proceeding direction of light from the light source, disposed at a side of a bottom of the display panel, to provide the light to the display panel.

The non-emissive display devices generally use color filters for displaying colors, and the color filters may absorb a significant amount of light, thereby substantially reducing the luminance of the display device.

SUMMARY

An exemplary embodiment of a lighting unit for a display device according to the invention includes: a plurality of light sources which emits light; a wedge-shaped light guide having an incident surface disposed close to the light sources and an opposing surface disposed opposite the incident surface; and a lens sheet disposed on the light guide, where the lens sheet includes a plurality of lenses, each having an axis in a direction from the incident surface to the opposing surface, where the light guide is thinner at the incident surface than at the opposing surface, and a radius of curvature of each of the lenses is larger at the incident surface than the opposing surface.

In an exemplary embodiment, the radius of curvature of each of the lenses may become smaller from the incident surface to the opposing surface.

In an exemplary embodiment, the radius of curvature of each of the lenses may be substantially in proportion to a distance from the opposing surface.

In an exemplary embodiment, the radius of curvature (R) of a lens of the lenses may satisfy the following equation:

$$R = (n-1) \times [(a/M)y + (b/M)],$$

where n denotes refractive index of the lens among the lenses, M denotes a magnification ratio of the lens, y denotes a position on the axis of the lens, 'a' and 'b' denote constants determined by a structure of the light guide, and a moving distance (H) of light from a corresponding light source among the light sources to the lens is given by 'ay+b'.

In an exemplary embodiment, a light spreading angle ($\theta$) may be given by the following equation:

$$\theta = \tan^{-1}\frac{1}{\frac{x}{H} - \frac{D(n-1)}{2R}} - \tan^{-1}\frac{1}{\frac{x}{H} + \frac{D(n-1)}{2R}},$$

where D denotes a pitch of the lenses, and x denotes a distance from the corresponding light source in a direction substantially perpendicular to the axis of the lens on a surface substantially parallel to the lens sheet.

In an exemplary embodiment, the light sources may include three primary color light sources.

In an exemplary embodiment, the light sources may include a first light source group including a first-color light source, and a plurality of second-color light sources arranged symmetrically with respect to the first-color light source.

In an exemplary embodiment, the first-color light source may include a green light source, and the second-color light sources may include two magenta light sources.

In an exemplary embodiment, the light sources may further include a white light source disposed closer to one of the two magenta light sources than the green light source.

In an exemplary embodiment, the light sources may further include a second light source group including a red light source, a green light source and a blue light source, which are arranged in sequence, and the second light source group may be disposed in a middle portion of an arrangement of the light sources.

An exemplary embodiment of a display device according to the invention includes: a plurality of light sources which emits light; a wedge-shaped light guide having an incident surface disposed close to the light sources and an opposing surface disposed opposite the incident surface; a lens sheet disposed on the light guide, where the lens sheet includes a plurality of lenses, each having an axis in a direction from the incident surface to the opposing surface; and a display panel disposed on the lens sheet, where the light guide is thinner at the incident surface than at the opposing surface, and a radius of curvature of each of the lenses is larger at the incident surface than the opposing surface.

In an exemplary embodiment, the radius of curvature of each of the lenses may become smaller from the incident surface to the opposing surface.

In an exemplary embodiment, the radius of curvature of each of the lenses may be substantially in proportion to a distance from the opposing surface.

In an exemplary embodiment, the radius of curvature (R) of a lens of the lenses may satisfy the following equation:

$$R = (n-1) \times [(a/M)y + (b/M)],$$

where n denotes refractive index of the lens among the lenses, M denotes a magnification ratio of the lens, y denotes a position on the axis of the lens, 'a' and 'b' denote constants determined by a structure of the light guide, and a moving distance (H) of light from a corresponding light source of the light sources to the lens is given by 'ay+b'.

In an exemplary embodiment, a light spreading angle ($\theta$) may be given by the following equation:

$$\theta = \tan^{-1}\frac{1}{\frac{x}{H} - \frac{D(n-1)}{2R}} - \tan^{-1}\frac{1}{\frac{x}{H} + \frac{D(n-1)}{2R}},$$

where D denotes a pitch of the lenses, and x denotes a distance from the corresponding light source in a direction substantially perpendicular to the axis of the lens on a surface substantially parallel to the lens sheet.

In an exemplary embodiment, the light sources may include a first light source group including a green source, and two magenta light sources arranged symmetrically with respect to the green light source.

In an exemplary embodiment, the light sources may further include a white light source disposed closer to one of the magenta light sources than the green light source.

In an exemplary embodiment, the light sources may further include a second light source group including a red light source, a green light source and a blue light source, which are arranged in sequence, and the second light source group may be disposed in a middle portion of an arrangement of the light sources.

In an exemplary embodiment, the display panel may include: a red pixel including a red color filter; a blue pixel including a blue color filter; and a green pixel disposed between the red pixel and the green pixel.

BRIEF DESCRIPTION OF THE DRAWINGS

The above and other features of the invention will become more apparent by describing in further detail exemplary embodiments thereof with reference to the accompanying drawings, in which.

DETAILED DESCRIPTION

Figure 1:
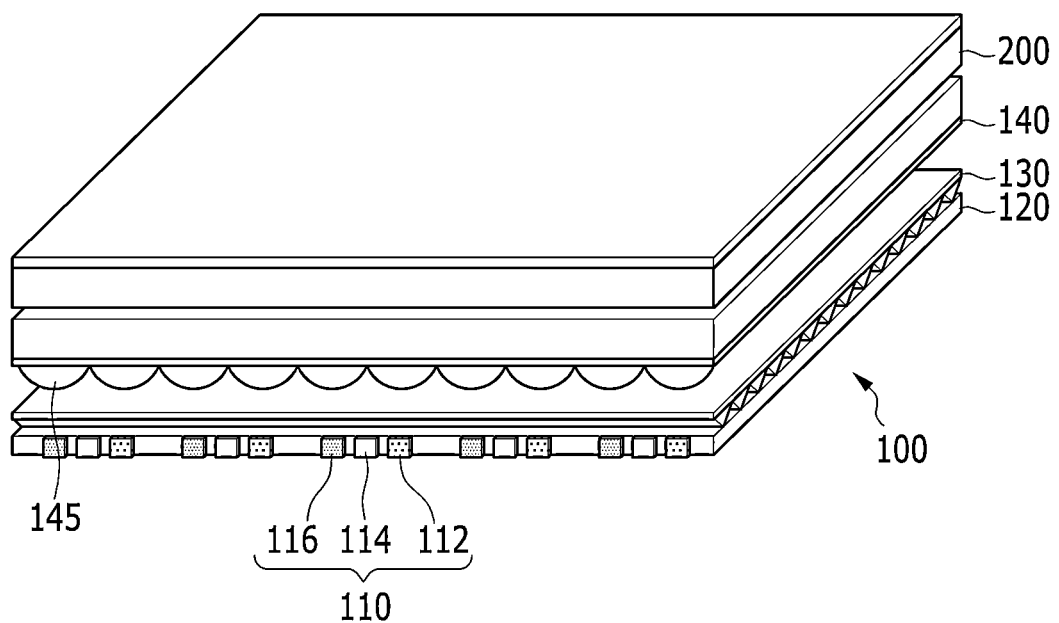
FIG. 1 is a schematic perspective view of an exemplary embodiment of a lighting unit for a display device according to the invention.

The invention will be described more fully hereinafter with reference to the accompanying drawings, in which exemplary embodiments of the invention are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims set forth herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, exemplary embodiments according to the invention will be described with reference to the accompanying drawings.

An exemplary embodiment of a light unit for a display device according to the invention will be described in detail with reference FIG. 1 to FIG. 7.

Figure 2:
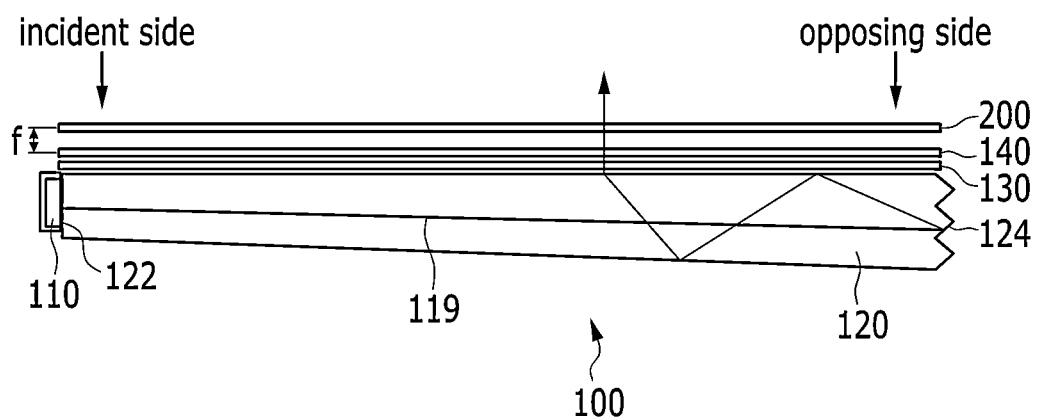
FIG. 2 is a schematic cross-sectional view of the lighting unit shown in FIG. 1.
Figure 3:
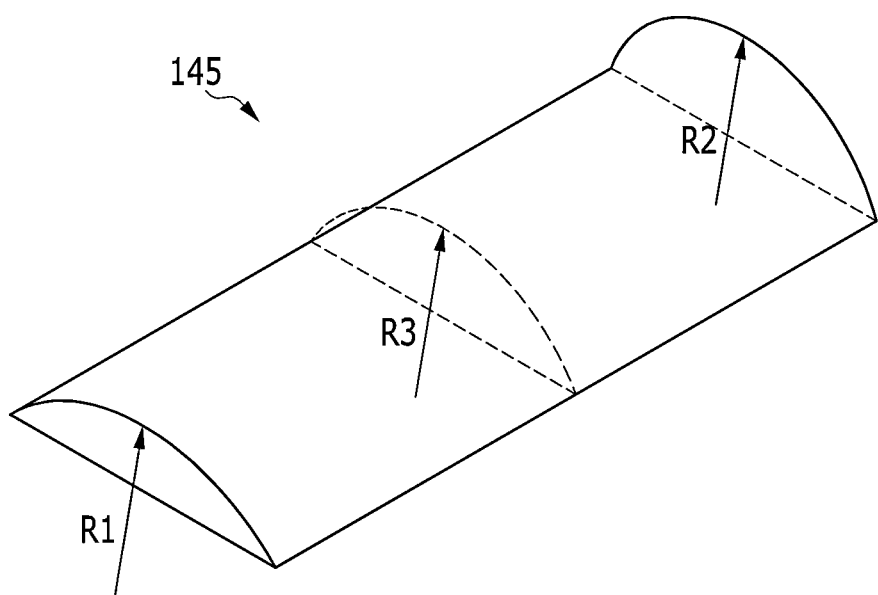
FIG. 3 is a schematic perspective view of an exemplary embodiment of a lens in the lighting unit shown in FIG. 1 and FIG. 2.
Figure 4:
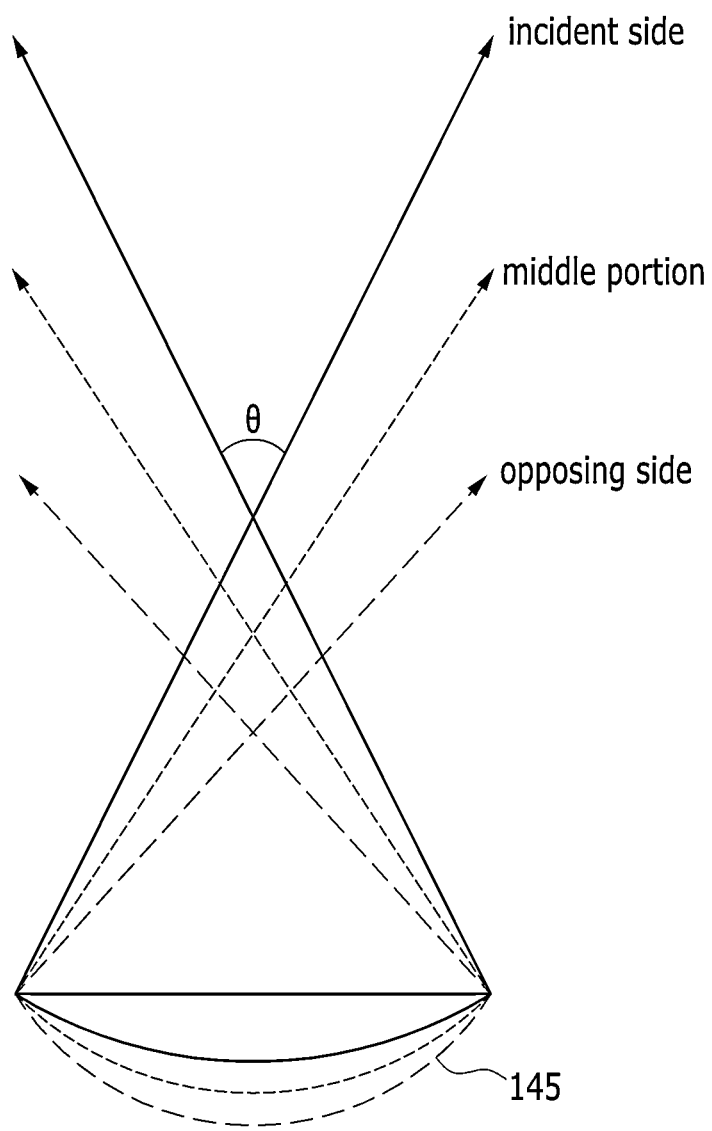
FIG. 4 is a schematic diagram showing paths of light passing through the lens shown in FIG. 3.

FIG. 1 is a schematic perspective view of an exemplary embodiment of a lighting unit for a display device according to the invention, FIG. 2 is a schematic cross-sectional view of the lighting unit shown in FIG. 1, FIG. 3 is a schematic perspective view of an exemplary embodiment of a lens in the lighting unit shown in FIG. 1 and FIG. 2, FIG. 4 is a schematic diagram showing paths of light passing through the lens shown in FIG. 3, and FIG. 5 to FIG. 7 are schematic diagrams showing operation of an exemplary embodiment of lighting unit of a display device according to the invention.

Referring to FIG. 1 and FIG. 2, an exemplary embodiment of a lighting unit 100 for a display device according to the invention includes a plurality of light sources 110, a light guide 120, an optical film 130 and a lens sheet 140. In FIG. 1, reference numeral 200 denotes a non-emissive display panel, for example, a liquid crystal display panel.

The light sources 110 may include, for example, light emitting diodes ("LED"), and may include light sources that emit three-primary color lights, for example, a red light source 112, a green light source 114 and a blue light source 116.

The light guide 120 may be wedge-shaped, and has an incident surface 122 close to the light sources 110 and an opposing surface 124 disposed opposite the incident surface. The opposing surface 124 has unevenness, and the thickness of the light guide 120 increases in a direction from the incident surface 122 to the opposing surface 124. Hereinafter, a side of each member in the lighting unit 100 and a side of the display panel 200 that are disposed close to the incident surface 122 will be referred to as "incident side," and a side thereof that are disposed near the opposing surface 124 will be referred to as "opposing side."

The optical film 130 may include a reverse prism sheet.

The lens sheet 140 includes a plurality of lens 145 having axes aligned in a direction from an incident side to an opposing side thereof. The radius of curvature of each of the lenses 145 is larger at the incident side than at the opposing side. In an exemplary embodiment, as shown in FIG. 3 and FIG. 4, the radius of curvature of the lens 145 decreases to become more convex as it goes from the incident side to the opposing side. In one exemplary embodiment, for example, the radius of curvature has a value R1 at the incident side that is greater than a value R2 at the opposing side, and has a value R3 between the incident side and the opposing side, which is less than the value R1 at the incident side and greater than the value R2 at the opposing side. According to an exemplary embodiment, the radius of curvature of the lens 145 may decrease in proportion to a distance from the opposing surface 122.

The lens sheet 140 is spaced apart from the display panel 200 by a predetermined distance f.

Referring to FIG. 4, in an exemplary embodiment, where the radius of curvature of the lens 145 is relatively large at the incident side and relatively small at the opposing side, a spreading angle of light 119 becomes relatively small at the incident side and relatively large at the opposing side. In such an embodiment, the luminance of the light 119 at the display panel 200 is substantially uniform.

Referring again to FIG. 2, the light 119 generated from the light sources 110 is incident on the light guide 120 through the incident surface 122 and advances toward the opposing surface 124. The light 119 may reach the opposing surface 124 after being reflected at boundary surfaces of the light guide 120, e.g., a top surface and a bottom surface of the light guide 120, or may directly reach the opposing surface 124 without reflection as shown in FIG. 2. The light 119 reaching the opposing surface 124 may be reflected, a propagating direction of the light 119 may be changed by the unevenness of the opposing surface 124, and then the light 119 may advance toward the top surface and/or the bottom surface of the light guide 120. The light 119 may be reflected at the top surface and/or the bottom surface of the light guide 120, and then escapes from the light guide 120 through the top surface when the angle of incidence on the top surface is less than a threshold angle. The light 119 emitted from the light guide 120 passes through the optical film 130 and a center of a lens 145 and then enters into the display panel 200.

Figure 5:
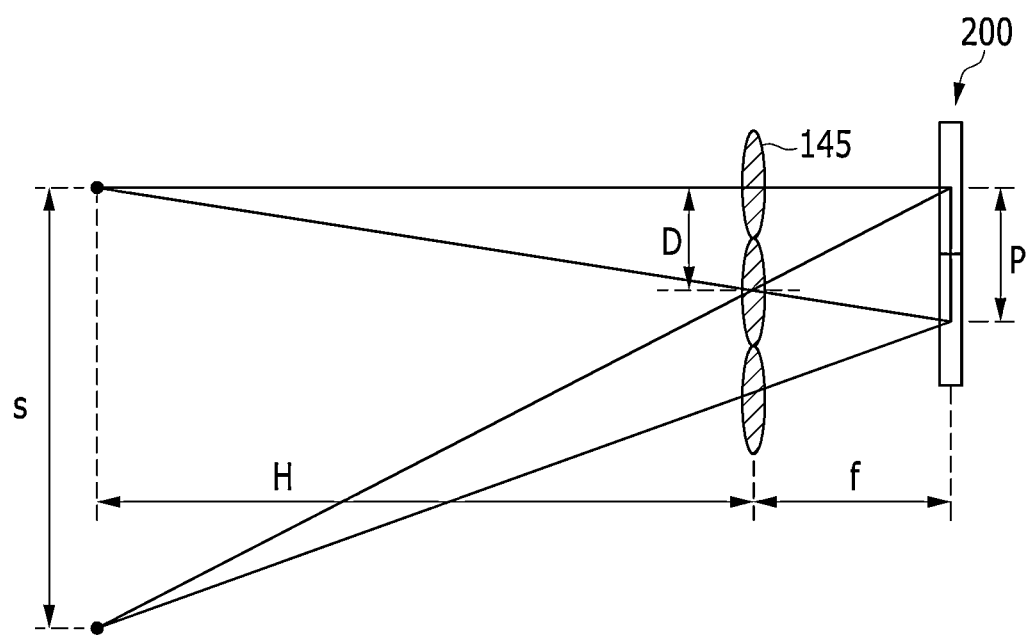
FIG. 5 to FIG. 7 are schematic diagrams showing an operation of an exemplary embodiment of a lighting unit for a display device according to the invention.
Figure 6:
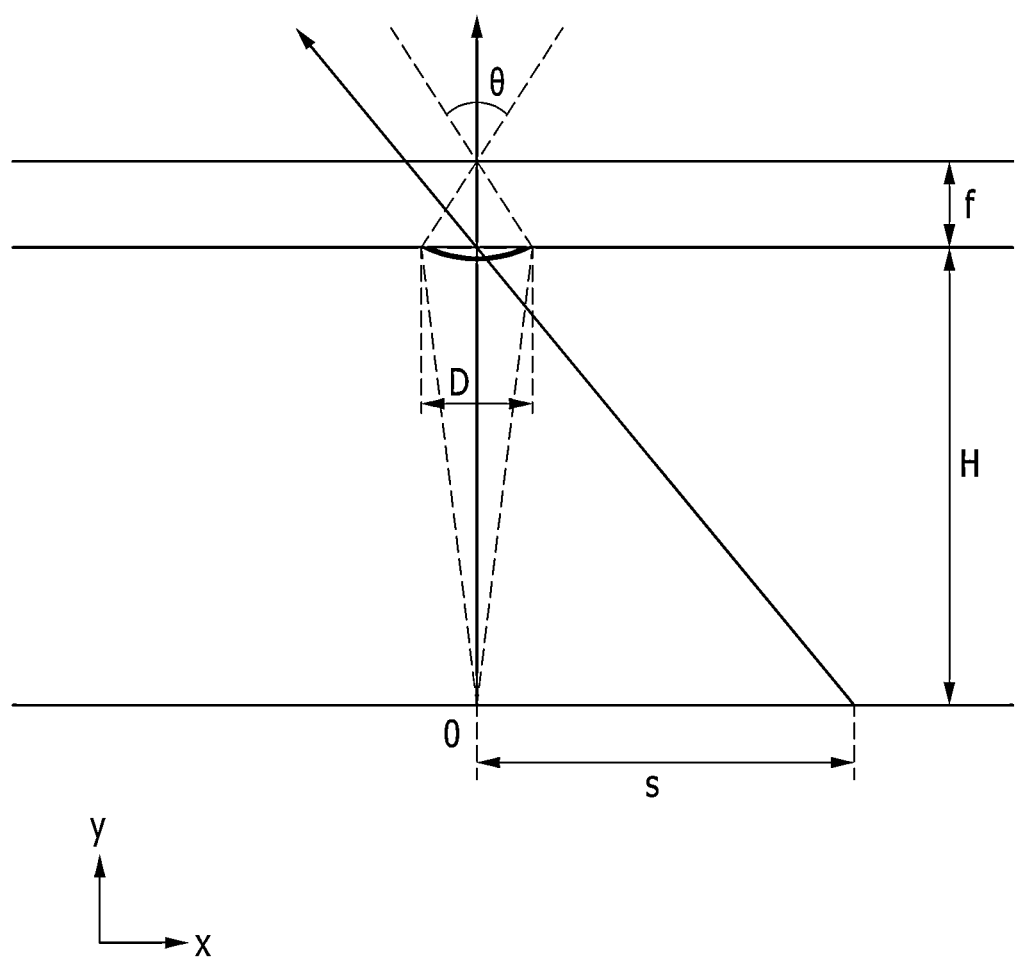
Figure 7:
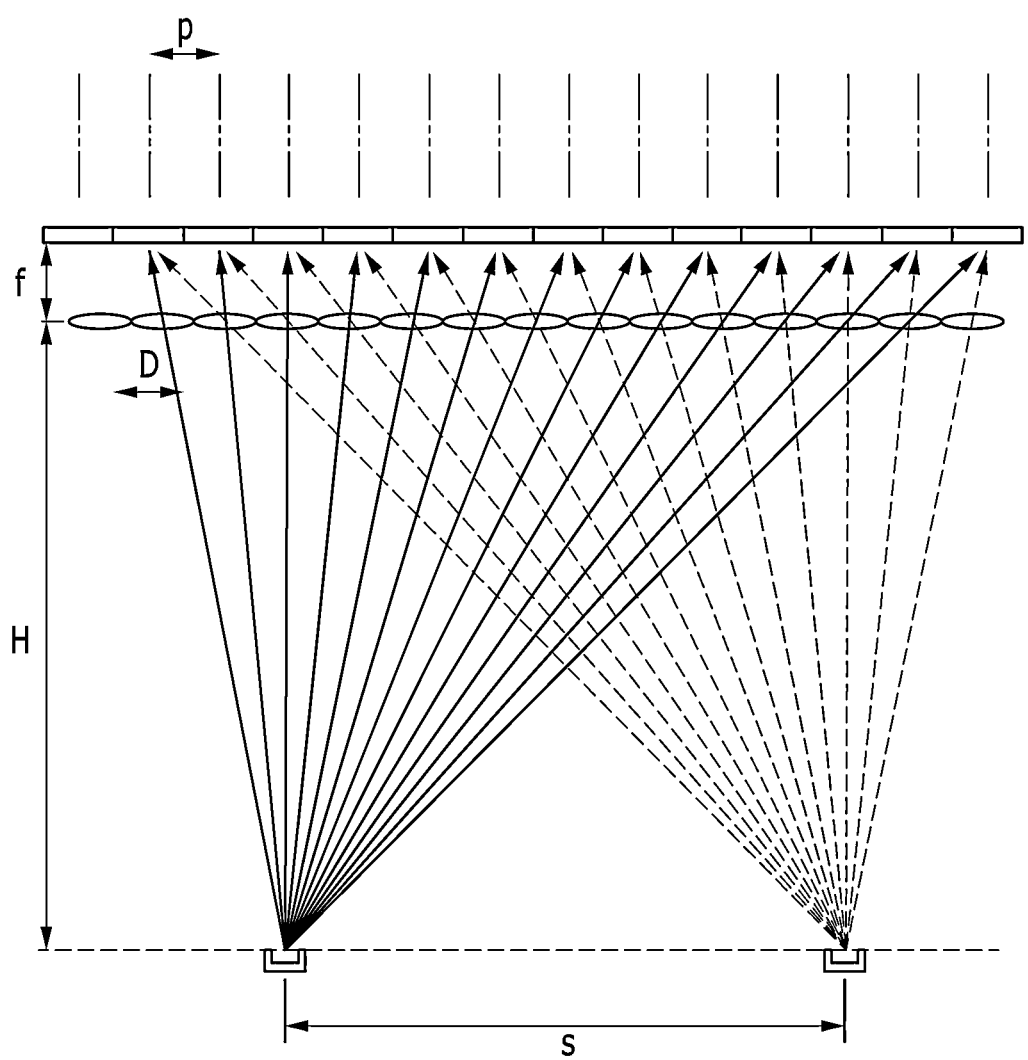

For convenience of description, a light path from a light source 110 to the display panel 200 is shown in a plan view in FIG. 5 to FIG. 7.

Referring to FIG. 5 and FIG. 6, a distance between the light sources 110 of the same color is denoted by s, a pitch of the lens 145 is denoted by D, a distance between the lens sheet 140 and the display panel 200 is denoted by f, a pitch of the pixels of the display panel 200 is denoted by p, and a moving distance of the light 119 from the light source 110 to the lens 145 is denoted by H. The distance s between the light sources 110 of the same color, the pitch D of the lens 145, the pitch P of the pixels 210 of the display panel 200, the moving distance H of the light 119 from the light source 110 to the lens 145 and the distance f between the lens sheet 140 and the display panel 200 satisfy the following equation 1 (Eq. 1) and equation 2 (Eq. 2).

$$s/H = p/f \qquad \text{(Eq. 1)}$$

$$p/(H+f) = D/H \qquad \text{(Eq. 2)}$$

Therefore, the pitch D of the lens 145 is given by the following equation 3 (Eq. 3).

$$D=pH/(H+f)=sf/(H+f). \quad (Eq.\ 3)$$

Referring to FIG. 7, when a magnification ratio of the lens 145 is denoted by M, the magnification ratio M of the lens 145 satisfies the following equation 4 (Eq. 4).

$$M=H/f=s/p \quad (Eq.\ 4)$$

Therefore, if the magnification ratio M of the lens 145 is an integer, all the light rays generated by the light sources 110 may be concentrated on a point of the display panel 200.

The moving distance H of the light 119 is given by the following equation 5 (Eq. 5).

$$H=ay+b, \quad (Eq.\ 5)$$

In Eq. 5, 'a' and 'b' denote constants determined based on a structure of the light guide 120, and y denotes a position in an axis substantially parallel to a propagation direction of light.

When H=fM obtained from Eq. 4 is inserted into Eq. 5, the following equation 6 (Eq. 6) may be obtained.

$$f=(a/M)y+(b/M). \quad (Eq.\ 6)$$

When a refractive index of the lens 145 is denoted by n, and the lens 145 is a thin lens, the following equation 7 (Eq. 7) may be satisfied.

$$f=R/(n-1). \quad (Eq.\ 7)$$

In Eq. 7, R denotes the radius of the lens 145.

From Eq. 6 and Eq. 7, the following equation 8 (Eq. 8) may be obtained.

$$R=(n-1)\times f=(n-1)\times[(a/M)y+(b/M)]. \quad (Eq.\ 8)$$

Therefore, a spreading angle θ at a position x is given by $$\theta = \tan^{-1}\frac{1}{\frac{x}{H}-\frac{D(n-1)}{2R}} - \tan^{-1}\frac{1}{\frac{x}{H}+\frac{D(n-1)}{2R}} \quad (Eq.\ 9)$$

When the light 119 is incident substantially perpendicularly, x/H may be about zero (θ).

Hereinafter, optical characteristics of an exemplary embodiment of the display device with a lens having a position-dependent radius of curvature according to the above-described equations and a comparative embodiment of the display device with a lens having a constant radius of curvature based on ray tracing simulation will now be described.

Figure 8:
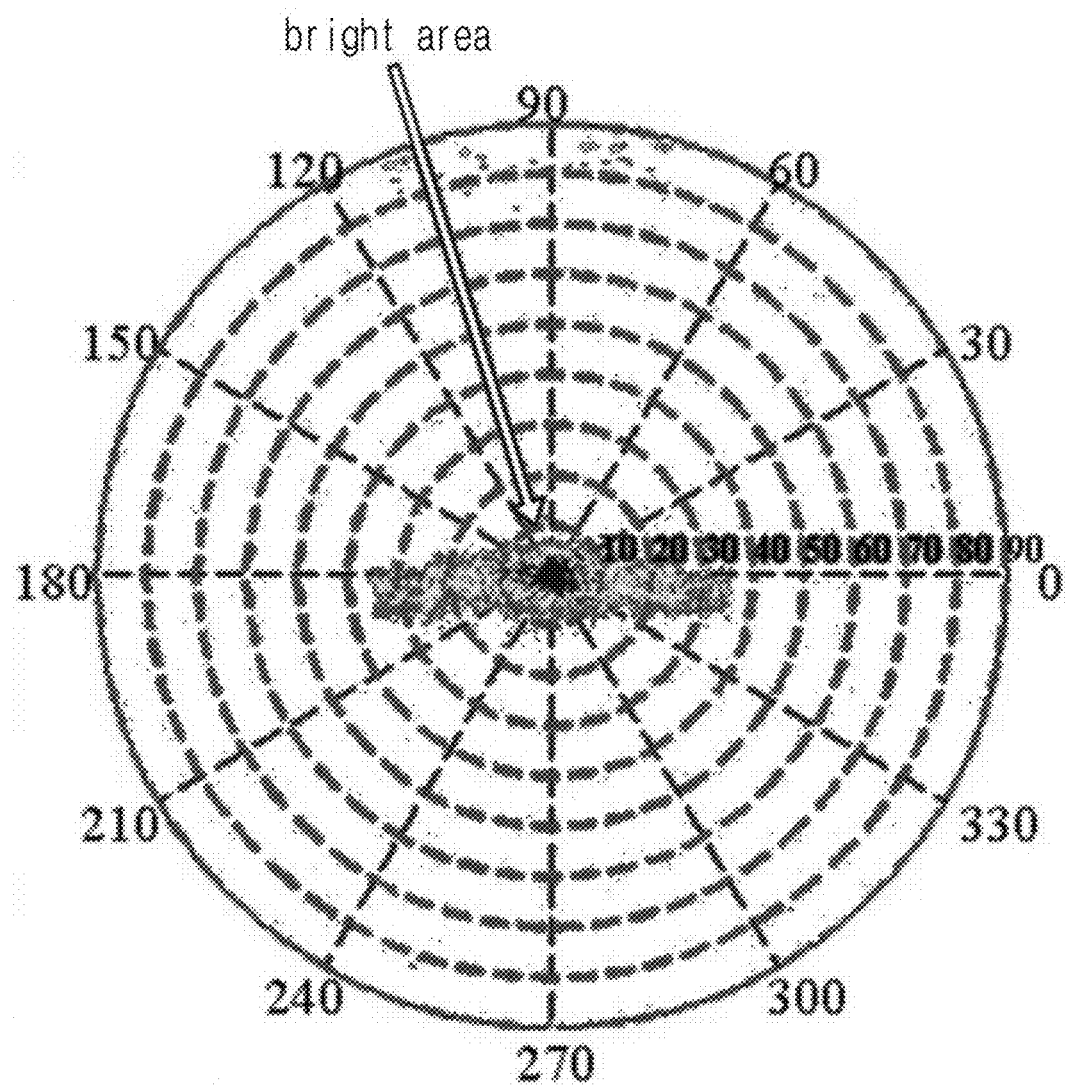
FIG. 8 and FIG. 9 are graphs illustrating luminance of an exemplary embodiment of the display device and a comparative embodiment of the display device, respectively, at an incident side as function of viewing angle.
Figure 9:
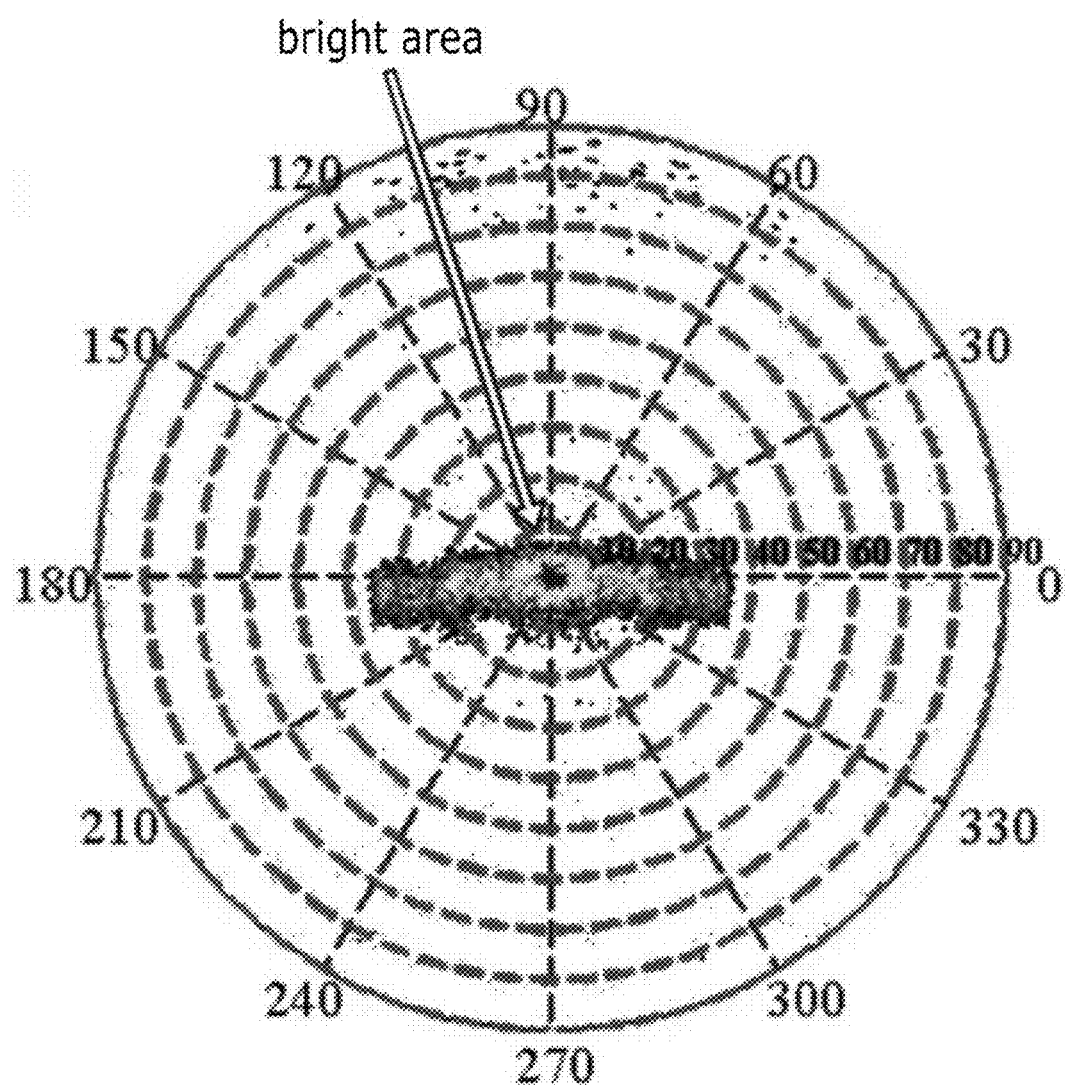
Figure 10:
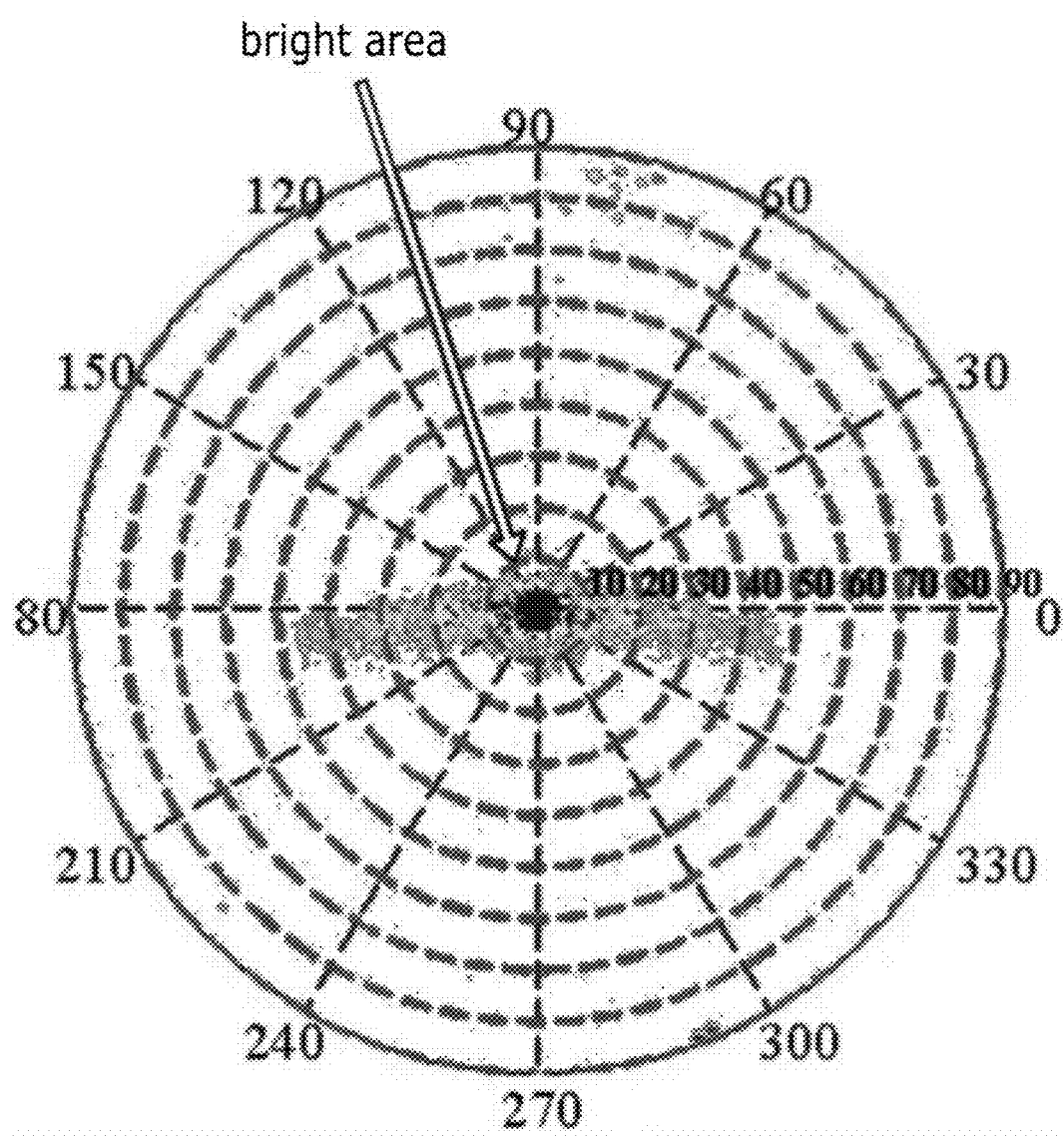
FIG. 10 and FIG. 11 are graphs illustrating luminance of an exemplary embodiment of the display device and a comparative embodiment of the display device, respectively, at a center as function of viewing angle.
Figure 11:
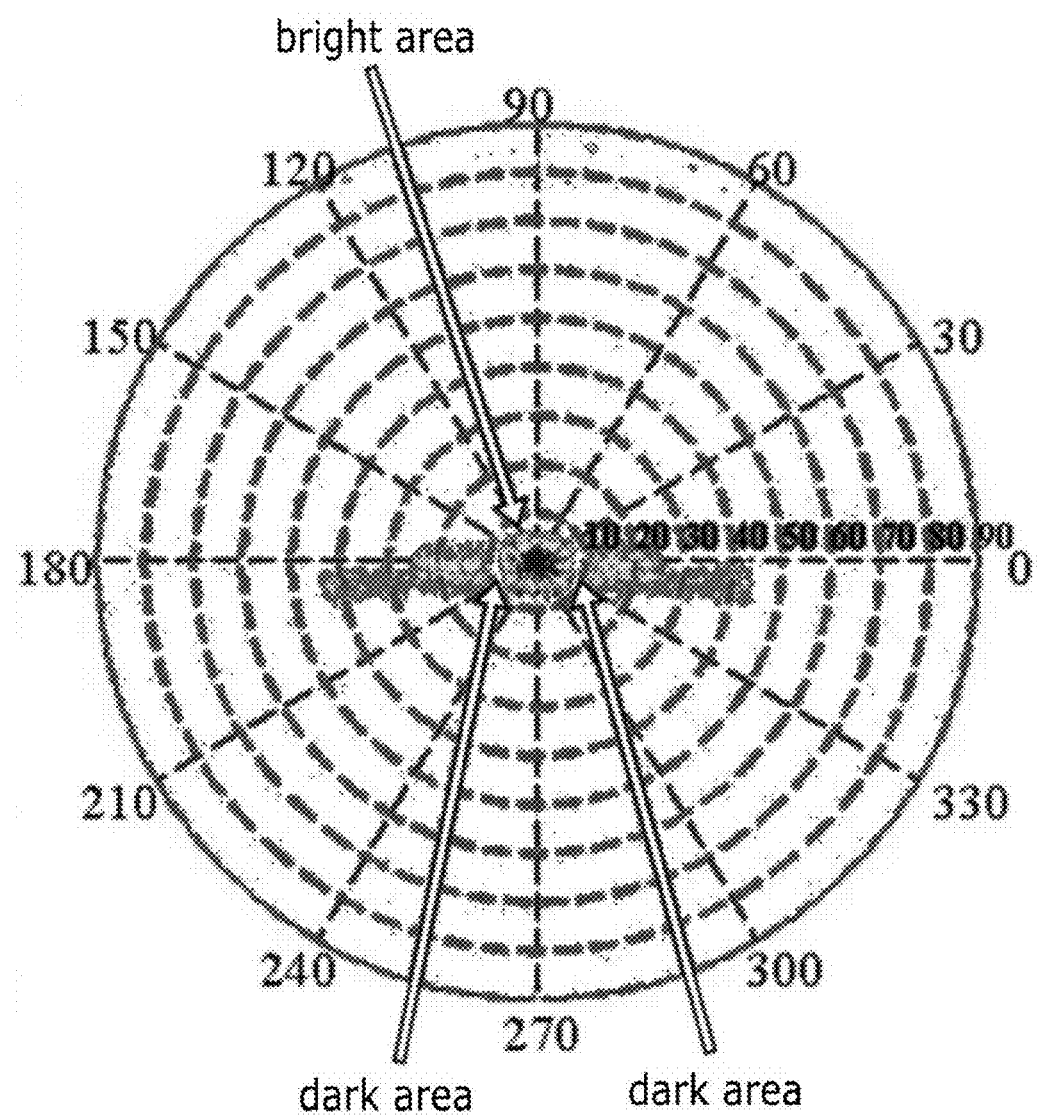
Figure 12:
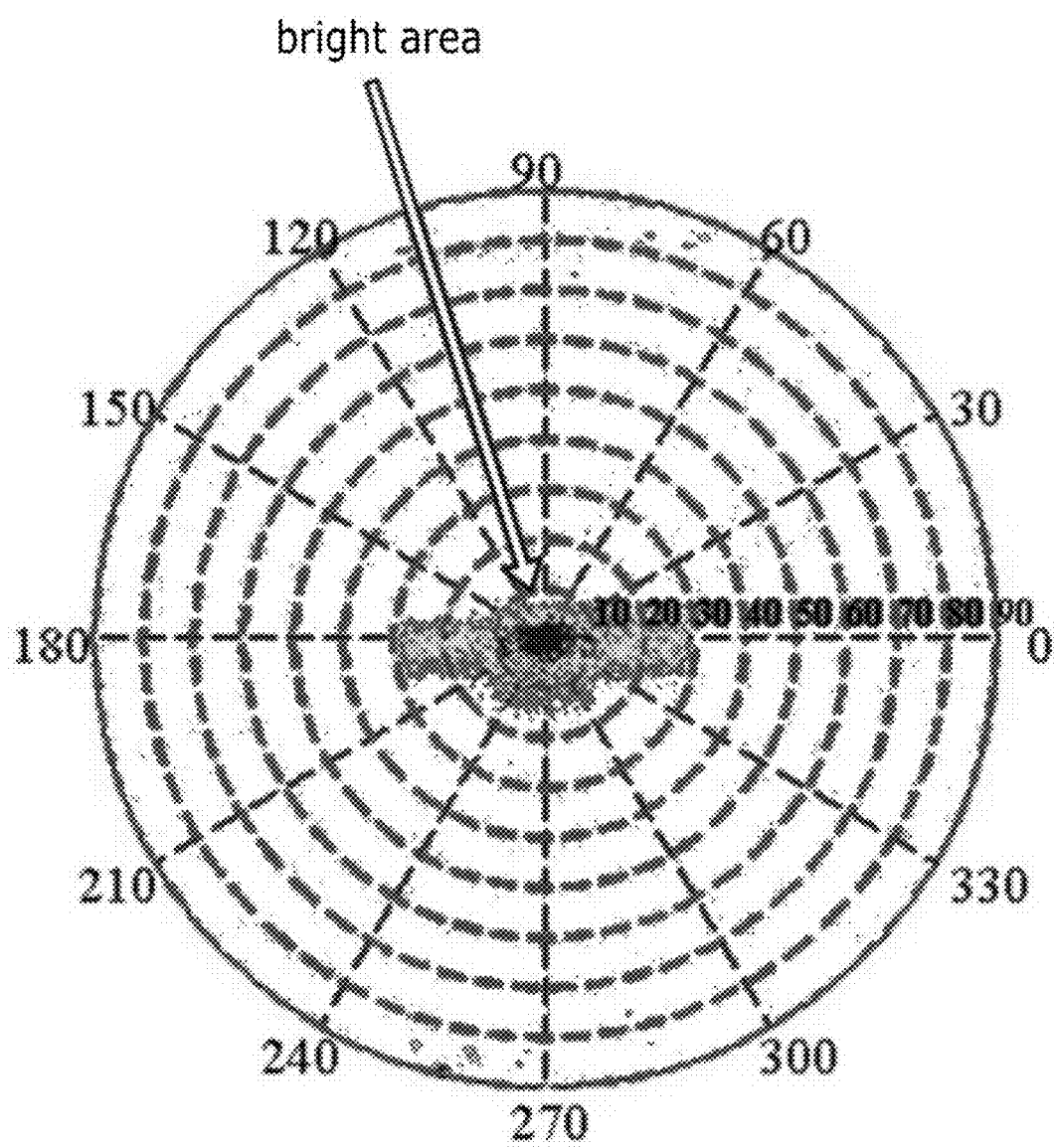
FIG. 12 and FIG. 13 are graphs illustrating luminance of an exemplary embodiment of the display device and a comparative embodiment of the display device, respectively, at an opposing side as function of viewing angle.
Figure 13:
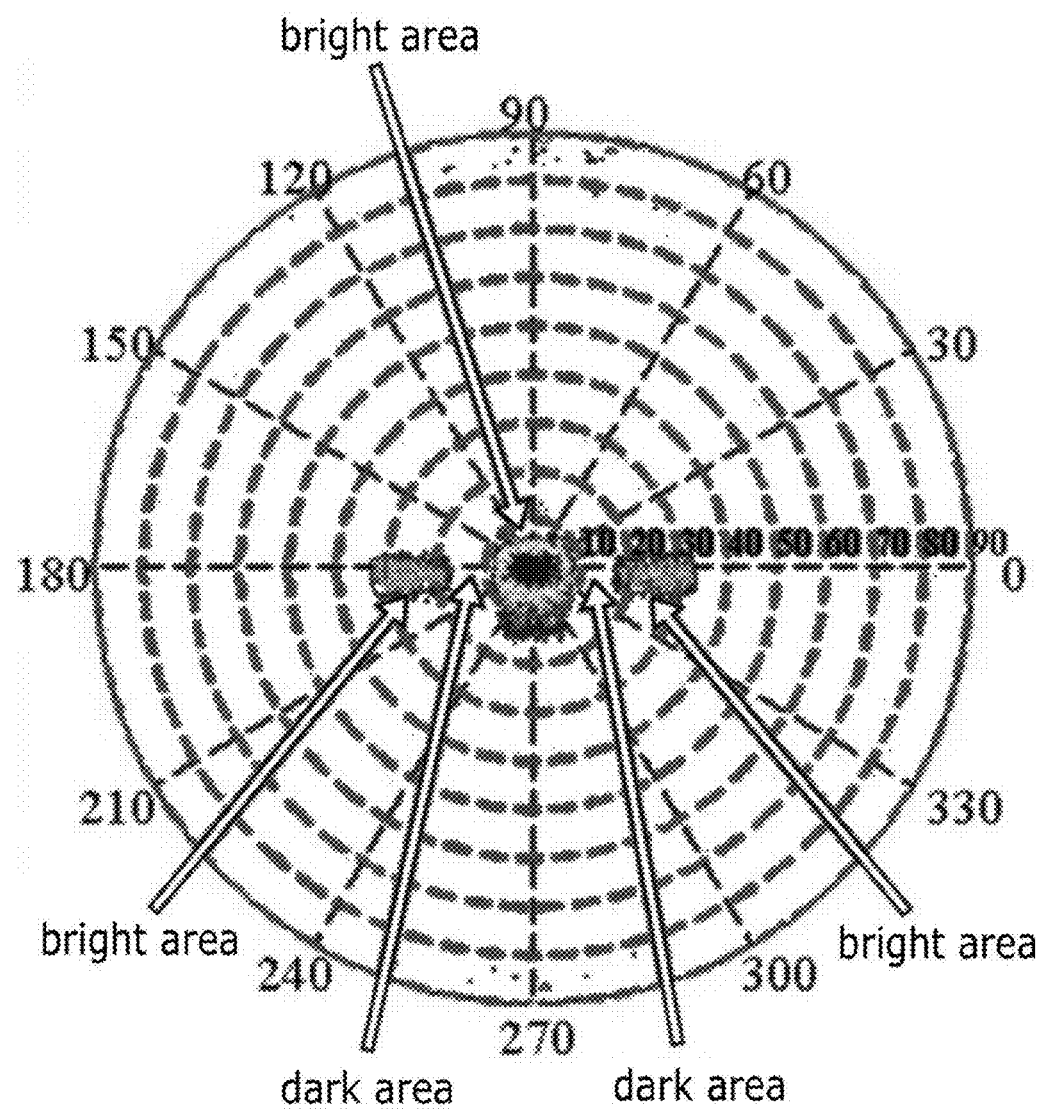

FIG. 8 and FIG. 9 are graphs illustrating luminance of an exemplary embodiment of the display device and a comparative embodiment of the display device, respectively, at an incident side as function of viewing angle, FIG. 10 and FIG. 11 are graphs illustrating luminance of an exemplary embodiment of the display device and a comparative embodiment of the display device, respectively, at a center as function of viewing angle, and FIG. 12 and FIG. 13 are graphs illustrating luminance of an exemplary embodiment of the display device and a comparative embodiment of the display device, respectively, at an opposing side as function of viewing angle.

Referring to FIG. 8 and FIG. 9 showing the luminance at the incident side, a band-shaped bright area is shown at a center of each of the graphs for the exemplary embodiment of the display device and the comparative embodiment of the display device, and the luminance at the incident side is shown to be higher in the graph of the exemplary embodiment of the display device than in the graph of the comparative embodiment of the display device. As shown in FIG. 8 and FIG. 9, an area with high luminance near a center of the bright area is wider in the graph of the exemplary embodiment of the display device than in the graph of the comparative embodiment of the display device, and the bright area in the graph of the comparative embodiment of the display device is surrounded by an area with substantially low luminance.

Referring to FIG. 10 and FIG. 11 showing the luminance at the center, the bright band at the center is longer than the bright band at the incident side in the graph of the exemplary embodiment of the display device while the bright band at the center is shorter and narrower than the bright band at the incident side in the graph of the comparative embodiment of the display device. In the graph of the comparative embodiment of the display device, dark areas in the middle of the bright band are shown as in FIG. 11.

Referring to FIG. 12 and FIG. 13 showing the luminance at the opposing side, the bright band at the opposing side is similar to the bright band at the incident side in the graph of the exemplary embodiment of the display device while the dark areas in the middle of the bright band is widened at the opposing side to separate the bright band into three distinct areas in the graph of the comparative embodiment of the display device.

Therefore, the uniformity in the luminance is substantially improved in the exemplary embodiment of the display device including the lens having varying radius as shown in FIG. 8 to FIG. 13.

Figure 14:
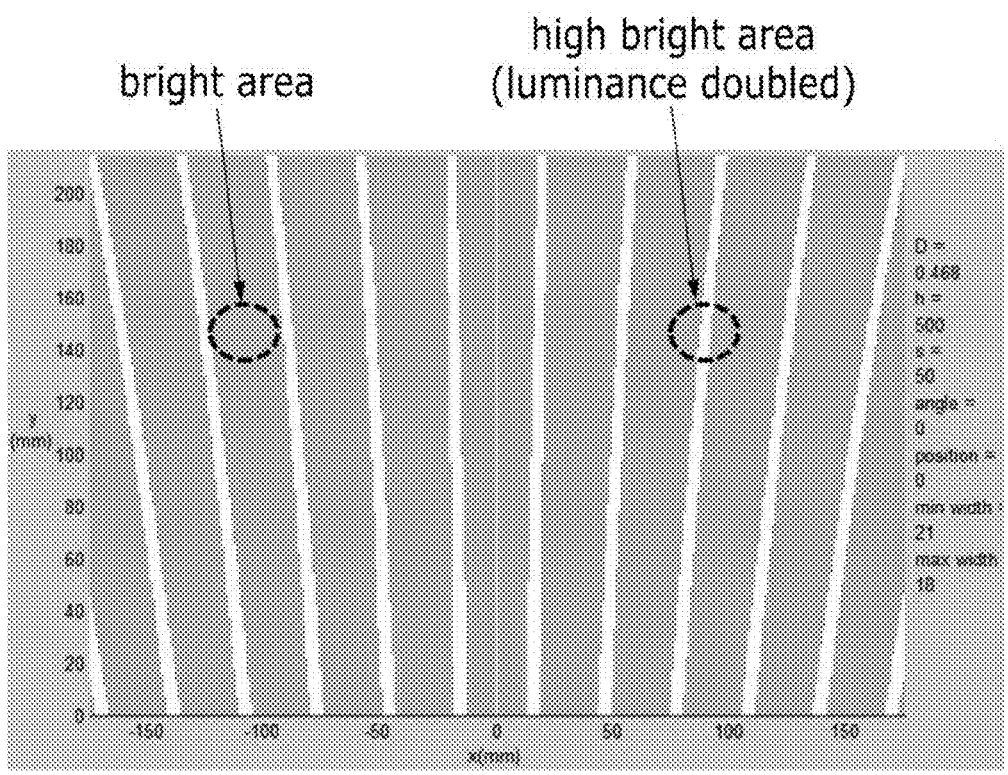
FIG. 14 and FIG. 15 are photographs of a screen of an exemplary embodiment of the display device and a screen of a comparative embodiment of the display device, respectively, when viewed from a same position.
Figure 15:
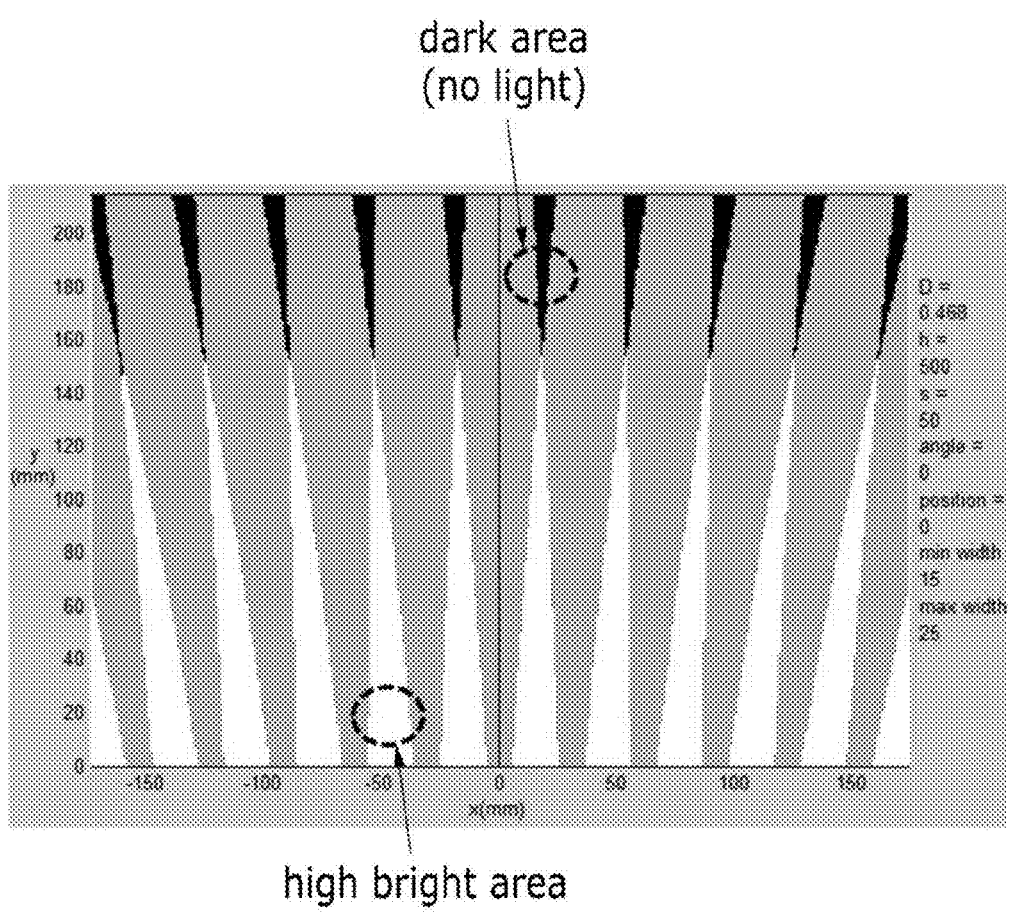

FIG. 14 and FIG. 15 are photographs of a screen of an exemplary embodiment of a display device and a screen of a comparative embodiment of a display device, respectively, when viewed from a same position.

In the photograph of the screen of the exemplary embodiment of a display device shown in FIG. 14, dark stripes with substantially uniform luminance and substantially uniform width are arranged such that the screen displays substantially uniform luminance. In the photograph of the screen of the comparative embodiment of a display device shown in FIG. 15, substantially dark wedge-shaped areas are shown in an upper portion of a screen and bright wedge-shaped areas are shown in a lower portion of the screen such that the screen displays relatively non-uniform luminance.

An arrangement of an exemplary embodiment of light sources for a lighting unit for a display device according to the invention will be described in detail with reference to FIG. 16 to FIG. 20.

Figure 16:
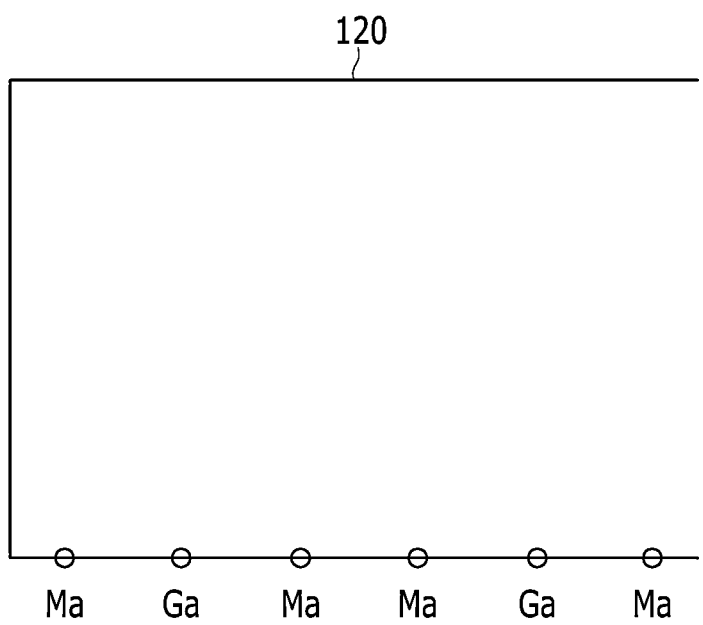
FIG. 16 is a schematic diagram illustrating an arrangement of an exemplary embodiment of light sources of a lighting unit for a display device according to the invention.
Figure 17:
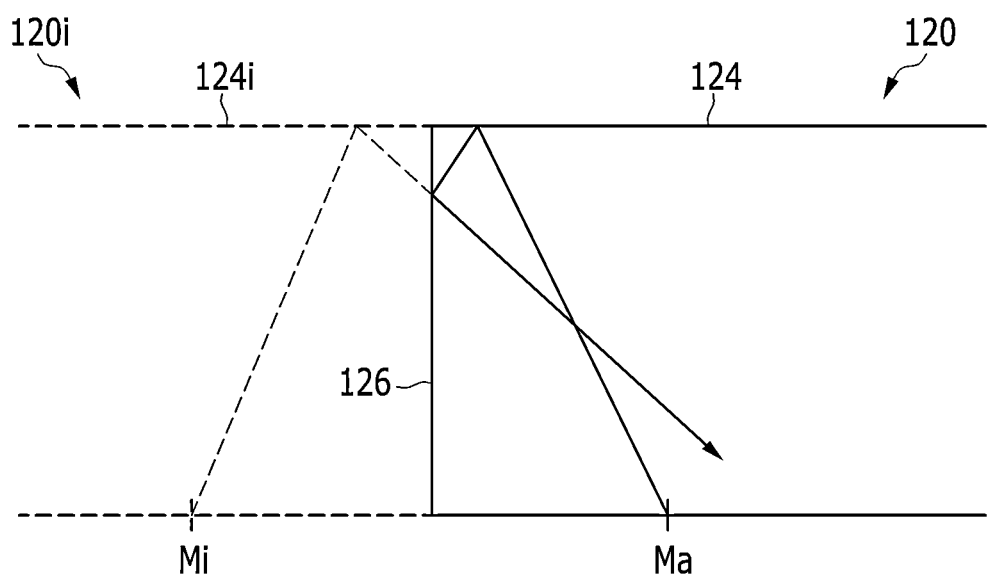
FIG. 17 to FIG. 19 are schematic diagrams illustrating reflection and incidence of light in the arrangement of light sources according to an embodiment of the invention.
Figure 18:
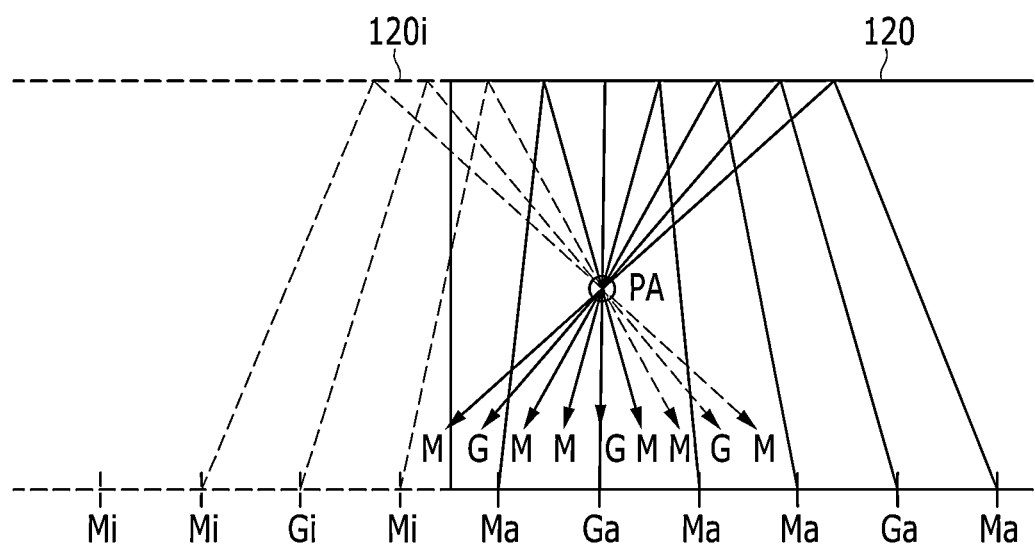
Figure 19:
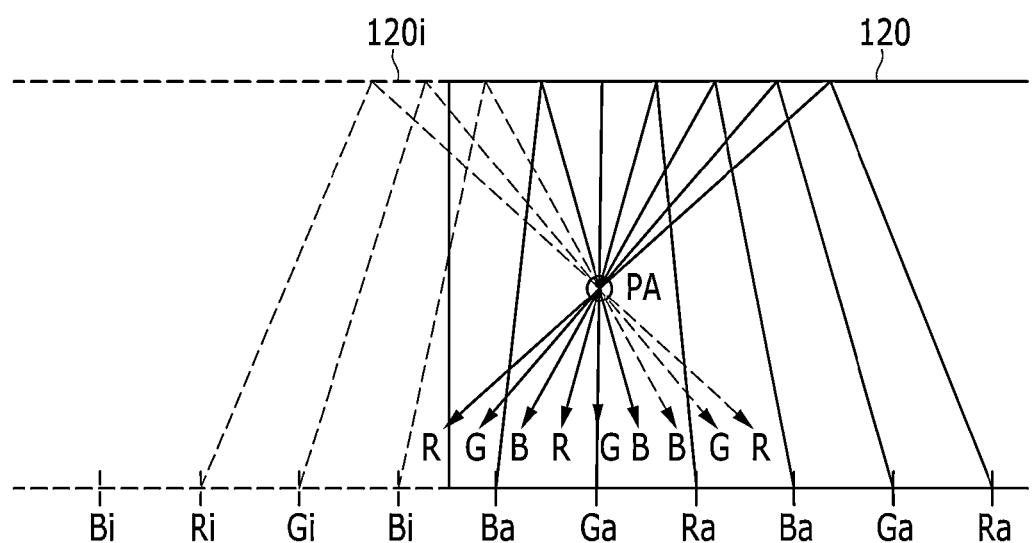
Figure 20:
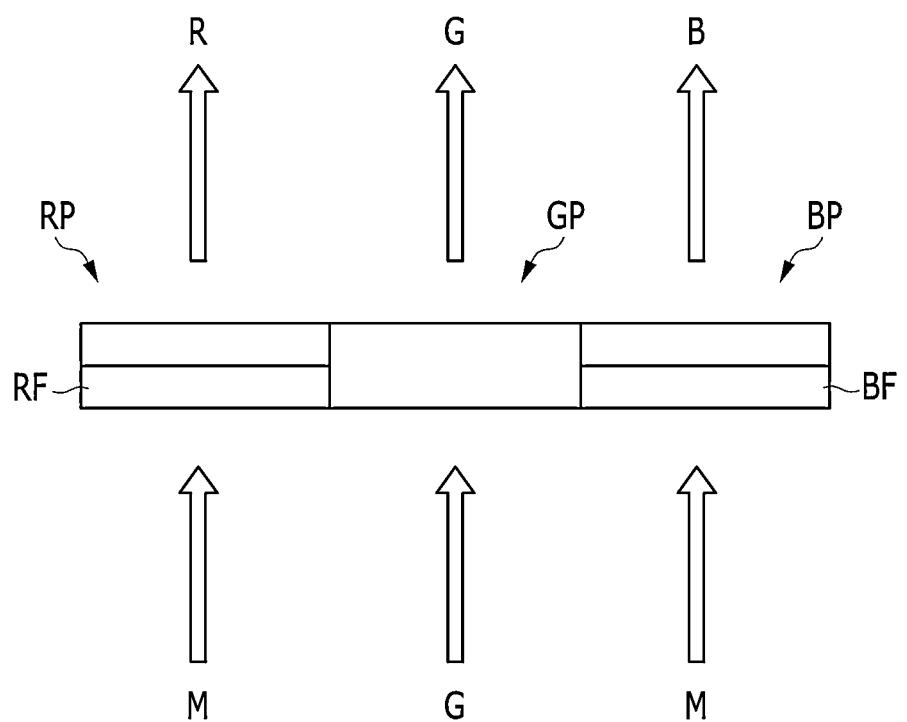
FIG. 20 is a schematic diagram showing an exemplary embodiment of a display device including the light sources arranged as shown in FIG. 16.

FIG. 16 is a schematic diagram illustrating an arrangement of an exemplary embodiment of light sources for a lighting unit for a display device according to the invention, FIG. 17 to FIG. 19 are schematic diagrams illustrating reflection and incidence of light from an exemplary embodiment of the light sources according to the invention, and FIG. 20 is a schematic diagram showing an exemplary embodiment of a display device including the light sources arranged as shown in FIG. 16.

Referring to FIG. 16, in an exemplary embodiment of the light sources, two magenta light sources Ma are disposed at opposing sides of a green light source Ga. In such an embodiment, the distance between the light sources Ma and Ga may be substantially constant.

In such an embodiment, an order of light rays is effectively prevented from being reversed when the light rays enter into the display panel 200 through a lateral side of the light guide 120, which will be described in detail with reference to FIG. 17 to FIG. 19.

Referring to FIG. 17, a light ray starting from a light source, for example, a magenta light source Ma, may be reflected in sequence by an opposing surface 124 and a lateral surface 126, and then may advance toward a display panel. The light ray may be considered to be equivalent to a light ray that starts from an imaginary light source Mi, which is disposed symmetrical to the actual light source Ma with respect to the lateral surface 126, and advances to the same target position after being reflected by an opposing surface 124i of an imaginary light guide 120i, which is disposed symmetrical to the actual light guide 120 with respect to the lateral surface 126.

Therefore, light rays entering into a predetermined position PA of an exemplary embodiment of a display panel may be as illustrated in FIG. 18, and the order of the light rays is magenta M-green G-magenta M, which is the same as the color arrangement of the light sources Ma and Ga. In FIG. 18, Mi and Gi denote imaginary magenta light sources and imaginary green light sources, respectively.

Referring to FIG. 19, in an exemplary embodiment, where a red light source Ra, a green light source Ga and a blue light source Ba are arranged in sequence from right to left, for example, the color order of light rays from red, green and blue imaginary light sources Ri, Gi and Bi is reversed to the color order of light rays from the actual light sources Ra, Ga and Ba. In such an embodiment, the color order of light rays from the actual light sources Ra, Ga and Ba is red ray R, green ray G and blue ray B in sequence from left to right, while the color order of light rays from the imaginary light sources Ri, Gi and Bi is blue ray B, green ray G and red ray R in sequence from left to right. Therefore, light mixing that a red ray R enters into a blue pixel and/or a blue ray B enters into a red pixel may occur.

In an exemplary embodiment, where two magenta light sources Ma are disposed opposite with respect to the green light source Ga, the light mixing is substantially reduced or effectively prevented. In such an embodiment, since a red light source and a blue light source are substituted with magenta light sources Ma, a red pixel RP and a blue pixel BP may include respective color filters, that is, a red filter RF and a blue filter BF, respectively, as shown in FIG. 20. In an exemplary embodiment, as shown in FIG. 20, a green pixel GP may not include a color filter since the green pixel GP receives green light G, and thus the green pixel GP may be substantially transparent, but not being limited thereto. In an alternative exemplary embodiment, the green pixel GP may include a color filter.

An arrangement of an alternative exemplary embodiment of the light sources of a lighting unit for a display device according to the invention will now be described in detail with reference to FIG. 21.

Figure 21:
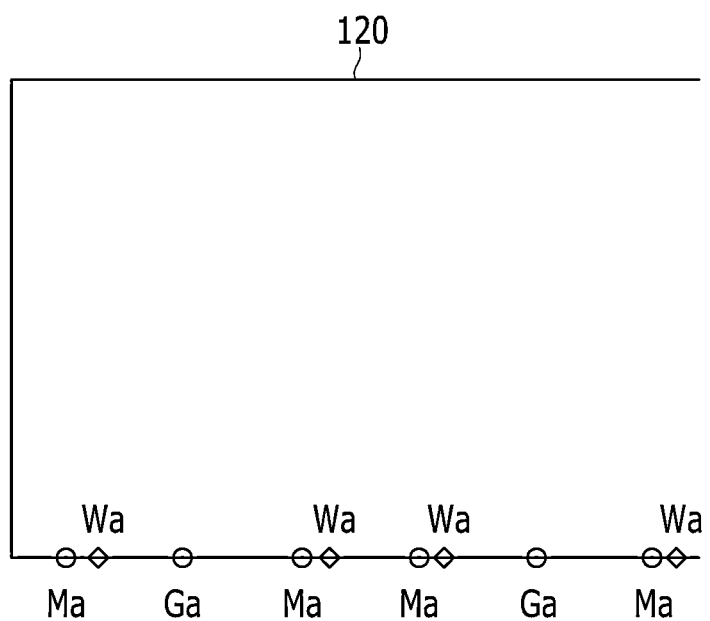
FIG. 21 is a schematic diagram illustrating an arrangement of an alternative exemplary embodiment of the light sources of a lighting unit for a display device according to the invention.

FIG. 21 is a schematic diagram illustrating an arrangement of an alternative exemplary embodiment of the light sources of a lighting unit for a display device according to the invention.

Referring to FIG. 21, in an exemplary embodiment of the light sources, white light sources Wa are further provided near magenta light sources Ma in the arrangement of the magenta light source Ma—the green light source Ga—the magenta light source Ma shown in FIG. 16. In such an embodiment, the white light sources Wa may compensate the absorption of light emitted from the magenta light sources Ma by color filters of red pixels or blue pixels.

An arrangement of another alternative exemplary embodiment of the light sources of a lighting unit for a display device according to the invention will be described in detail with reference to FIG. 22.

Figure 22:
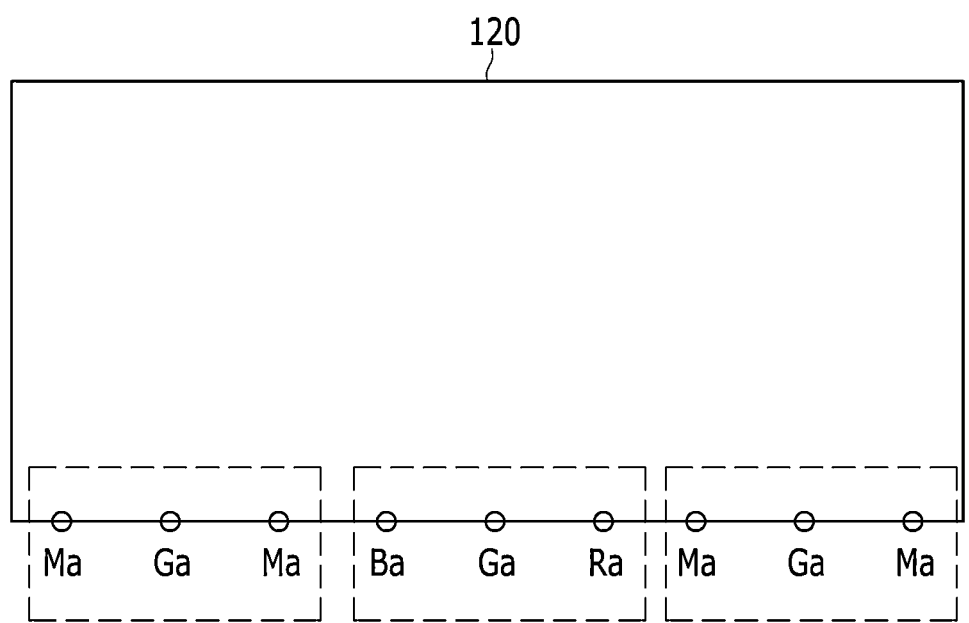
FIG. 22 is a schematic diagram illustrating an arrangement of another alternative exemplary embodiment of the light sources of a lighting unit for a display device according to the invention.

FIG. 22 is a schematic diagram illustrating an arrangement of another alternative exemplary embodiment of the light sources of a lighting unit for a display device according to the invention.

Referring to FIG. 22, an exemplary embodiment of the light sources has an arrangement of the magenta light source Ma—the green light source Ga—the magenta light source Ma shown in FIG. 16 near end portions, and has an arrangement of a red light source Ra—a green light source Ga—a blue light source Ba at a middle portion. In such an embodiment, the light mixing that a red ray R enters into a blue pixel and/or a blue ray B enters into a red pixel may be effectively prevented due to the arrangement of the magenta light source Ma—the green light source Ga—the magenta light source Ma near end portions at the lateral surface, while the light rays reflected by a lateral surface of the light guide 120 and reach the middle portion is substantially limited.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A lighting unit for a display device comprising:
a plurality of light sources which emits light;
a wedge-shaped light guide having an incident surface disposed close to the light sources and an opposing surface disposed opposite the incident surface;
an optical sheet disposed on the light guide; and
a lens sheet disposed on the optical sheet and spaced apart from the light guide, wherein the lens sheet comprises a plurality of lenses, each having an axis in a direction from the incident surface to the opposing surface,
wherein,
the light guide is thinner in height at the incident surface than at the opposing surface,
a radius of curvature of each of the lenses adjacent to the incident surface is larger than the radius of curvature thereof adjacent to the opposing surface, and
the radius of curvature (R) of a portion of a lens of the lenses satisfies the following equation:

$R=(n-1)-[(a/M)y+(b/M)]$, wherein n denotes refractive index of the lens of the lenses, M denotes a magnification ratio of the lens, y denotes a position of the portion on the axis of the lens, and 'a' and 'b' denote constants determined based on a structure of the light guide, and
wherein a moving distance (H) of light from a corresponding light source of the light sources to the portion of the lens is given by 'ay+b'.

2. The lighting unit of claim 1, wherein the radius of curvature of each of the lenses becomes smaller from the incident surface to the opposing surface.

3. The lighting unit of claim 2, wherein the radius of curvature of a portion of each of the lenses is substantially in proportion to a distance of the portion of each of the lenses from the opposing surface.

4. The lighting unit of claim 1, wherein a light spreading angle (θ) satisfies the following equation:

$$\theta = \tan^{-1} \frac{1}{\frac{x}{H} - \frac{D(n-1)}{2R}} - \tan^{-1} \frac{1}{\frac{x}{H} + \frac{D(n-1)}{2R}},$$

wherein D denotes a pitch of the lenses, and x denotes a distance from the corresponding light source in a direction substantially perpendicular to the axis of the lens on a surface substantially parallel to the lens sheet.

5. The lighting unit of claim 1, wherein the light sources comprise three primary color light sources.

6. The lighting unit of claim 1, wherein the light sources comprise a first light source group comprising:
- a first-color light source; and
- a plurality of second-color light sources arranged substantially symmetrically with respect to the first-color light source.

7. The lighting unit of claim 6, wherein
the first-color light source comprises a green light source, and
the second-color light sources comprise two magenta light sources.

8. The lighting unit of claim 7, wherein the light sources further comprise a white light source disposed closer to one of the two magenta light sources than the green light source.

9. The lighting unit of claim 7, wherein
the light sources further comprise a second light source group comprising a red light source, a green light source and a blue light source, which are arranged in sequence, and
the second light source group is disposed in a middle portion of an arrangement of the light sources.

10. A display device comprising:
- a plurality of light sources which emits light;
- a wedge-shaped light guide having an incident surface disposed close to the light sources and an opposing surface disposed opposite the incident surface;
- an optical sheet disposed on the light guide;
- a lens sheet disposed on the optical sheet and spaced apart from the light guide, wherein the lens sheet comprises a plurality of lenses, each having an axis in a direction from the incident surface to the opposing surface; and
- a display panel disposed on the lens sheet,
wherein
the light guide is thinner in height at the incident surface than at the opposing surface,
a radius of curvature of each of the lenses adjacent to the incident surface is larger than the radius of curvature thereof adjacent to the opposing surface, and
the radius of curvature (R) of a portion of a lens of the lenses satisfies the following equation, $R=(n-1)\times[(a/M)y+(b/M)]$, wherein n denotes refractive index of the lens of the lenses, M denotes a magnification ratio of the lens, y denotes a position of the portion on the axis of the lens, and 'a' and 'b' denote constants determined based on a structure of the light guide, and
wherein a moving distance (H) of light from a corresponding light source of the light sources to the portion of the lens is given by 'ay+b'.

11. The display device of claim 10, wherein the radius of curvature of each of the lenses becomes smaller from the incident surface to the opposing surface.

12. The display device of claim 11, wherein the radius of curvature of a portion of each of the lenses is substantially in proportion to a distance of the portion thereof from the opposing surface.

13. The display device of claim 10, wherein a light spreading angle ($\theta$) satisfy the following equation:

$$\theta = \tan^{-1}\frac{1}{\frac{x}{H}-\frac{D(n-1)}{2R}} - \tan^{-1}\frac{1}{\frac{x}{H}+\frac{D(n-1)}{2R}},$$

wherein D denotes a pitch of the lenses, and x denotes a distance from the corresponding light source in a direction substantially perpendicular to the axis of the lens on a surface substantially parallel to the lens sheet.

14. The display device of claim 10, wherein the light sources comprise:
a first light source group comprising:
a green source; and
two magenta light sources arranged symmetrically with respect to the green light source.

15. The display device of claim 14, wherein the light sources further comprise a white light source disposed closer to one of the magenta light sources than the green light source.

16. The display device of claim 14, wherein the light sources further comprise:
a second light source group comprising a red light source, a green light source and a blue light source, which are arranged in sequence, and
the second light source group is disposed in a middle portion of an arrangement of the light sources.

17. The display device of claim 14, wherein the display panel comprises:
a red pixel comprising a red color filter;
a blue pixel comprising a blue color filter; and
a green pixel disposed between the red pixel and the green pixel.

* * * * *